United States Patent
Poulis et al.

(10) Patent No.: US 7,660,408 B1
(45) Date of Patent: Feb. 9, 2010

(54) ATTENUATION AND TERMINATION CIRCUIT USING IMPEDANCE SYNTHESIS

(75) Inventors: Spiro Poulis, West Jordan, UT (US); John Evans, Riverton, UT (US); Shayne Messerly, Farmington, UT (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/560,581

(22) Filed: Apr. 28, 2000

(51) Int. Cl.
*H04M 1/00* (2006.01)
*H04M 9/00* (2006.01)

(52) U.S. Cl. .................... 379/390.01; 379/2; 379/24; 379/29.04; 379/30

(58) Field of Classification Search .......... 375/219, 375/220, 222, 257, 377; 379/399.01, 394, 379/93.09, 93.15, 93.05, 93.06, 93.36, 413, 379/413.02, 390.01, 398, 1.01, 22.04, 22.07, 379/23, 24, 2, 27.01, 29.03, 29.04, 29.05, 379/30, 31
See application file for complete search history.

(56) References Cited

U.S. PATENT DOCUMENTS

| 4,395,590 | A |   | 7/1983 | Pierce et al. |
|-----------|---|---|--------|---------------|
| 4,829,562 | A | * | 5/1989 | Meschkat et al. ............ 379/235 |
| 5,181,240 | A |   | 1/1993 | Sakuragi et al. |
| 5,343,520 | A | * | 8/1994 | Willocx et al. ......... 379/399.01 |
| 5,528,131 | A |   | 6/1996 | Marty et al. |
| 5,790,656 | A |   | 8/1998 | Rahamim et al. |
| 5,809,068 | A |   | 9/1998 | Johnson |
| 5,815,567 | A |   | 9/1998 | Davis et al. |
| 6,567,472 | B1 | * | 5/2003 | Poulis et al. ................ 375/257 |

* cited by examiner

*Primary Examiner*—Binh K Tieu

(57) ABSTRACT

The present invention discloses circuits for isolating and attenuating signals generated by a telephone network. In disclosed embodiments, a metering pulse signal is isolated from the terminals of the connecting device, and then attenuated with an impedance that is synthesized with a programmable digital signal processor. Embodiments also utilize the digital signal processor to synthesize a termination impedance for the connecting device. The termination impedance matches closely the characteristic impedance of the network, so as to minimize wave reflections and the like.

13 Claims, 3 Drawing Sheets

ATTENUATION AND TERMINATION CIRCUIT USING IMPEDANCE SYNTHESIS

BACKGROUND OF THE INVENTION

1. Field of the Invention

The present invention relates to circuitry for terminating and attenuating electrical signals. More particularly, the present invention relates to circuitry for isolating and attenuating incompatible signals present on a telephone network, such as a metering pulse signal.

2. Present State of the Art

The primary function of a telephone network (commonly referred to as the public switched telephone network, or PSTN) is to transmit audio signals. Accordingly, telephone networks have been optimized to carry signals having frequencies and amplitudes that fall within the audio spectrum. However this has limited the ability to utilize the telephone network as a transmission medium for other types of signals falling within different frequency spectrums. Similarly, problems can arise when non-traditional telephone equipment, such as modems, are connected to the telephone.

For a device to connect to the telephone network, it must be able to interpret the various signals that are present on the telephone network. In addition, the device must comply with various standards that are imposed by the telephone network. For instance, in the U.S., to connect to the PSTN, the central switching office places a direct current voltage of approximately −48 volts on the telephone line, and requires that a connecting device, such as a telephone or modem, draw little or no current when the device is not in use. This requirement is satisfied by designing the connecting device to have a large, specified impedance when the device is not in use, referred to as the on hook state. This large impedance effectively creates an open circuit which draws little current.

Another example of a PSTN mandated requirement is that when the device is being used (off-hook), the impedance of the device must closely match the characteristic impedance of the telephone network, typically 600 ohms. This ensures that the signal being transmitted over the telephone network is not reflected due to an impedance mismatch. Thus, a connecting device must be capable of presenting different impedances to the telephone network, depending on its connection state.

The design of a telephone network-connecting device becomes more complex when signals having frequencies and amplitudes that are different from conventional audio signals are present on the telephone network. One such signal is referred to as a "metering pulse signal." While not present in the U.S. PSTN, in some countries, the telephone network generates metering pulse signals that have a carrier frequency at or above 12 kHz. The metering pulse signal permits entities such as small business to obtain instant billing information so that the cost of a telephone call can be identified. By instantly knowing the cost of a telephone call, the business can charge its customers appropriately.

The metering pulse signal, in addition to having a frequency that is typically higher than voice communications, has peak amplitudes on the order or 20 to 40 volts. As such, the signal can be detrimental to the operation of modems and other connecting devices. For example, the signal can saturate the receive amplifier, corrupt the data, and can physically damage electrical components of the connecting device. In addition, the metering pulse signal, like other signals present on the telephone network, is subject to certain specifications. In particular, the metering pulse signal cannot be attenuated by more than a prescribed amount of about 3 dβ at the input terminals of the connecting device.

One solution to the problem presented by signals such as the metering pulse signal is to use an external podule that contains an attenuation filter. However, this approach is not entirely satisfactory because of the additional cost incurred in order to manufacture, stock and distribute the podules. In addition, the customer is burdened with not only additional equipment that must be connected to the modem, but also with the additional cost associated with purchasing the podules.

Thus, it would be an advancement in the art to provide the ability to limit the detrimental effects of incompatible telephone network signals, such as metering pulse signals, on certain network connecting devices, such as modems. Moreover, it would be an advance in the art to provide a protection scheme that doesn't require extra external equipment, such as an external filtering podule.

OBJECTS AND SUMMARY

In view of the foregoing and other problems in the prior art, it is an overall object of one embodiment of the present invention to provide a system and method that allows a connecting device to operate on a telephone network in the presence of an incompatible network signal, by electrically isolating and attenuating the incompatible signal.

Another objective is to provide a system and method that accomplishes such signal isolation and attenuation without using equipment, such as filter podules.

It is a another object to provide a system and method that attenuates an incompatible signal present on a telephone network or other communication network by automatically generating and providing a synthesized impedance, thereby preventing the signal from interfering with the operation of a connecting device, such as a modem.

Another objective is to isolate and attenuate the incompatible signal, such as a metering pulse signal, in a manner that does not interfere with the operation of the telephone network, or in a manner that otherwise violates the operating characteristics of the network.

It is also an objective of embodiments of the present invention to automatically synthesize a termination impedance that substantially matches the impedance of the telephone network, thereby preventing wave reflections and signal losses.

In summary, these and other objectives are obtained with embodiments of the present invention, that include a circuit that isolates a network device from frequency-undesirable or frequency-incompatible signals that may be present in a telephone network, and that utilizes a synthesized impedance to attenuate the signal level of any undesirable network signal. Because the signal is attenuated, it does not interfere with the operation of the network connected device. Embodiments also provide the ability to synthesize desired termination impedance, so that the network connected device matches the characteristic impedance of the network.

One example of the type incompatible signal addressed is the metering pulse signal described above. As was noted, a metering pulse signal has a carrier frequency on the order of 12 kHz or more, and has peak amplitude of 20 to 40 volts or more, which can be incompatible with and even damaging to certain network connected devices, such as a modem.

The detrimental effects of this type of incompatible network signal are prevented when embodiments of the present invention are implemented in network connected devices. Presently preferred embodiments provide an electrical path for the metering pulse signal (or other incompatible signal) to electrically isolate it from the terminals of the connecting device. For example, in one embodiment a resistive circuit that is located such that the termination impedance of the connecting device is substantially unaffected performs the isolation. Moreover, the approach ensures that the metering pulse signal is not attenuated more than 3 dB across the tip and ring terminals, less than an amount that would violate the requirements of the PSTN.

Once the metering pulse signal has been electrically isolated, an impedance synthesis circuit automatically generates impedance. The impedance value is such that the metering pulse signal is attenuated by a predetermined amount at the end of the isolating resister away from the wire pair terminals, such as the previously mentioned tip and ring terminals. The impedance synthesis circuitry effectively performs the function of a notch filter, but does not require the use of physical circuit components typically used in filters, such as capacitors, inductors, and the like. Also, electrical components already existing within the modem or other network connected device can be used to perform the impedance synthesis function. This eliminates the need for any external, or additional parts, thereby reducing cost, manufacturing complexity, and operational complexity.

In addition, in preferred embodiments, the impedance synthesis circuitry is implemented so as to be much more precise than conventional filter podules using discrete components, because the impedance synthesis is implemented in a manner so as to preferably emulate the behavior of ideal circuit components by way of a digital signal processor. The impedance synthesis, in combination with the isolation resistor, effectively eliminates the harmful effects of the metering pulse signal (or similar signal) on connecting devices such as modems. In operation, the attenuation circuitry can cause the metering pulse signal to effectively disappear at the input of the receive amplifier of a modem, or similar network connected device. As such, the metering pulse signal has no detrimental effect on the operation of the device. Moreover, the metering pulse signal is not attenuated at the terminals of the connecting device in violation of the specifications of the telephone network.

Embodiments of the present invention also generate a desired termination impedance for the network connected device. Preferably, this synthesized impedance matches the characteristic impedance of the network, so as to avoid wave reflections, and thereby maintain compatibility with the network.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
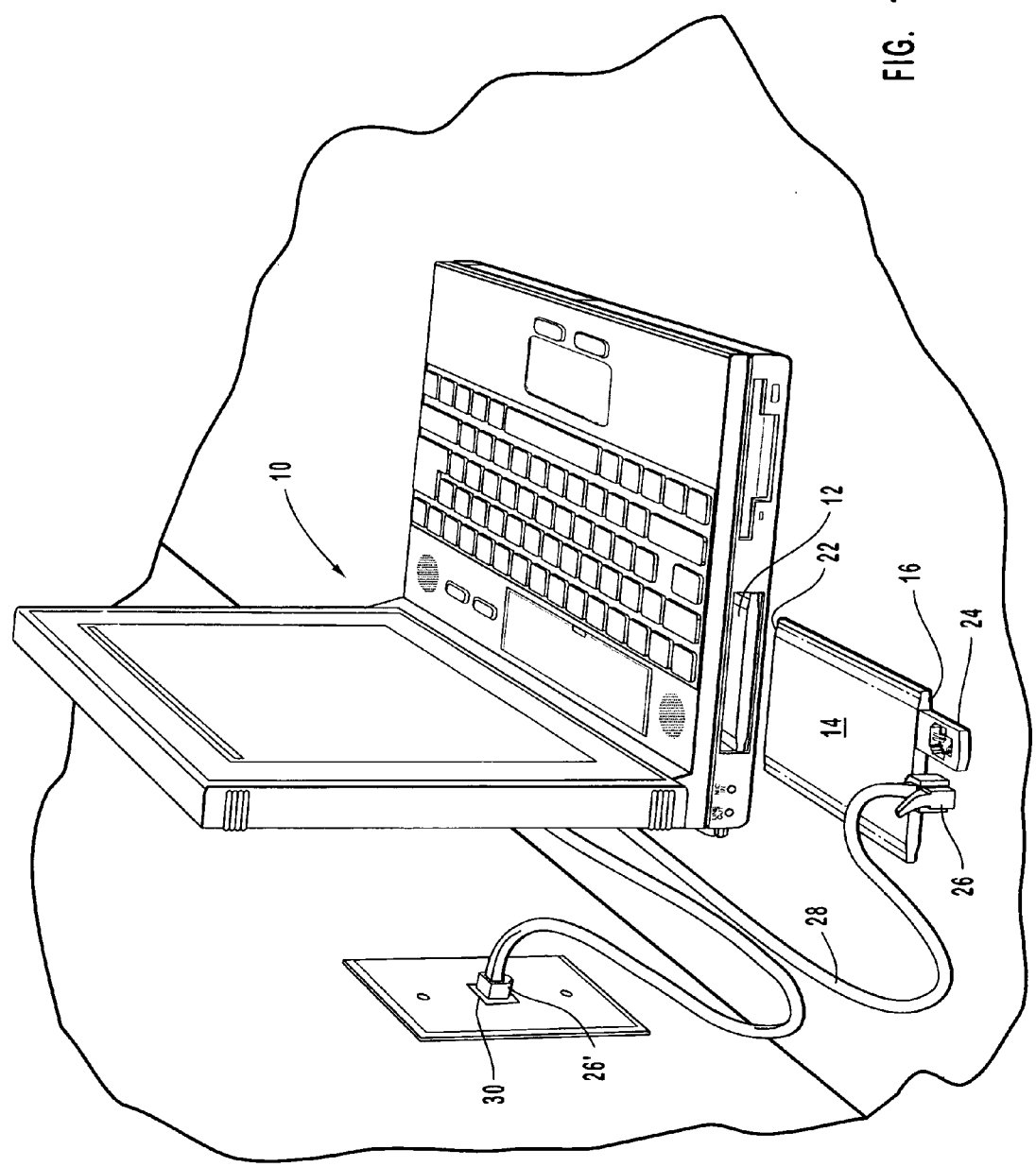
FIG. 1 is an illustration of an exemplary system for implementing the systems and methods of the present invention.

Devices that connect or interface with a telephone network are usually designed to comply with standards specified by that telephone network. For example, the specifications may require that signals have certain frequencies and amplitudes and/or may require that the connecting devices present a specified termination impedance to the network. A device that does not comply with specified requirements may not operate with the telephone network, and may have an adverse effect on the operation of telephone network.

The design of a telephone or other connecting device is complicated by the fact that many differences exist between the specifications of telephone networks in different countries. In some instances, a telephone network may produce signals that are not present on other telephone networks, resulting in connecting device incompatibility. The ability of a connecting device to function in more than one telephone network is dependent on its ability to deal with such incompatible signals.

One example of a signal that is incompatible with certain connecting devices, such as modems, is known as a metering pulse signal. The metering pulse signal typically has a carrier frequency greater than 12 kHz and has peak voltages on the order of 20 to 40 or more volts. As described previously, the signal can disrupt the communication capabilities of the connecting device. In the case of a modem, the metering pulse signal may cause the communication to end prematurely or may introduce erroneous data into the communication. Additionally, the high voltages of the metering pulse signal can damage the modem's electrical components, which are usually designed to operate with voltages lower than 5 volts.

Embodiments of the present invention overcome the challenges presented by the metering pulse, or similar types of incompatible signals. Also, presently preferred embodiments can be integrated or incorporated with a connecting device, thereby eliminating the necessity of having external filters. Moreover, the number of additional circuit components is minimized by taking advantage of components and systems that may already be present on a connecting device. The elimination of podules and the utilization of existing subsystems lowers the overall cost and complexity of the connecting device.

Preferred embodiments of the present invention utilize systems and methods that introduce superior accuracy compared to solutions that use physical circuit elements because the metering pulse is attenuated by systems and methods that are comparable to ideal circuit elements. Also, preferred embodiments of the present invention can be easily adjusted to accommodate the various frequencies which may be present on different telephone networks. It will be appreciated that while the present invention is described in terms of a metering pulse signal, the systems and methods of the present invention are not limited to this particular signal, and can be applied to other such incompatible signals present in a telephone network, or other network such as a computer network.

Reference is first made to FIG. 1, which is an exemplary system or environment in which the present invention may be utilized or implemented. FIG. 1 is intended to be illustrative of potential systems which may utilize the present invention and is not to be construed as limiting. The system of FIG. 1 illustrates a portable computer 10 having a PCMCIA compliant slot 12 which is configured to receive a PCMCIA compliant card 14, which may be a modem, a network interface card, or any other card. The interface 22 of the card 14 is configured to detachably connect with a connector (not shown) inside slot 12. Inserting the card 14 in slot 12 permits the card 14 to be in physical and electrical communication with computer 10.

The card 14 also includes a connector 24, which is illustrated in FIG. 1 as an RJ type connector, but may be of any type, including but not limited to, a 15-pin connector or a coaxial cable connector. The connector 24 is configured to removably receive a plug 26, which is connected to one end of the cable 28. The other end of the cable 28 is connected to a plug 26', which is capable of detachably connecting with the jack 30. The jack 30 is typically connected to a telephone network, a private branch exchange (PBX) system, or any type of computer network. A user needing access to the telephone network or other system gains access to that system through the jack 30. Through the jack 30, or through any other system access point, the computer 10, and more specifically card 14, is capable of communication with the network to which jack 30 provides access. With regard to the metering pulse signal, the jack 30 provides access to the telephone network and the card 14 is capable of receiving the signals generated by the telephone network through the jack 30.

Figure 2:
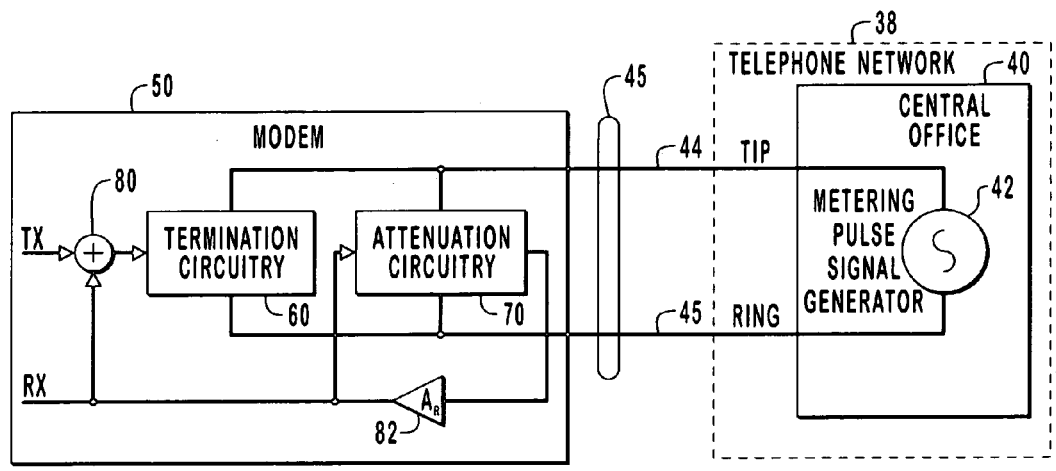
FIG. 2 is a block diagram of one presently preferred embodiment of the circuitry for isolating, and attenuating undesirable signals present on a telephone network, and for providing a desired termination impedance.

Reference is next made to FIG. 2, which is a block diagram of an exemplary system implementing a preferred embodiment of the present invention. The telephone network 38 comprises a central office 40, which is responsible for generating the signals that are pertinent to the operation of telephone network 38. The central office 40 is the source of the dial tone, the ringing signal and other signals; one example is a metering pulse signal, which is produced by the metering signal source 42. The signals generated by central office 40 are transmitted over wire pair 45, which comprises tip 44 and ring 46 in this embodiment. Wire pair 45 is an example of a telephone loop through which central office 40 applies various dc and ac voltages. Any device connecting to telephone network 38 usually sends and receives signals over the wire pair 45 and through the central office 40.

A modem 50 is an exemplary connecting device that is capable of interfacing with telephone network 38. As described previously, the modem 50 is required to comply with the specifications detailed by the telephone network 38, including any requirements of the applicable regulatory agency. For example, the telephone network 38 may specify a characteristic impedance $Z_O$, which is usually on the order of 600 ohms. In order to function properly, modem 50 must have a termination impedance of 600 ohms such that signal reflection is minimized and power transfer is maximized. The termination impedance specified by telephone network 38 is provided in this embodiment by termination circuitry 60, described in further detail below.

FIG. 2 also illustrates how presently preferred embodiments include attenuation circuitry 70, which is preferably designed to meet at least two objectives. First, attenuation circuitry 70 must comply with the requirements of telephone network 38. Secondly, the attenuation circuitry 70 prevents the metering pulse signal (or similar incompatible signal) from interfering with the operation of the modem 50 or other connecting device.

With respect to the first objective, as noted previously the telephone network 38 typically mandates that the metering pulse signal must not be attenuated by more than a certain amount at the terminals of the connecting device. Presently preferred embodiments of the attenuation circuitry 70 addresses this objective by providing a circuit path for the metering pulse signal that is sufficiently isolated from tip 44 and ring 46. The isolation of the attenuation circuitry 70 ensures that the metering pulse signal is not attenuated by more than the amount specified by telephone network 38 at the terminals of modem 50. However, with respect to the receive amplifier 82 of modem 50, the metering pulse signal is attenuated such that it does not interfere with the operation of modem 50.

Basically, the function of attenuation circuitry 70 is similar to that of a physical notch filter or low pass filter circuit. A low pass or notch filter is used in some instances to prevent signals having particular frequencies from passing. The attenuation circuitry 70 functions like a low pass or notch filter in the sense that only desired signals are attenuated in a preferred embodiment, while the data and other audio signals are not affected by the attenuation circuitry 70. Thus the loop action attenuates the signal such that the specifications of telephone network 38 are satisfied with regard to the attenuation of the metering pulse signal at the terminals of the connecting device and the operation of the connecting device is not impaired. Additionally, the attenuation loop, that includes attenuation circuitry 70, prevents the metering pulse signal from saturating receive amplifier 82 and prevents the metering pulse signal from interfering with the data being transmitted to the modem 50.

Figure 3:
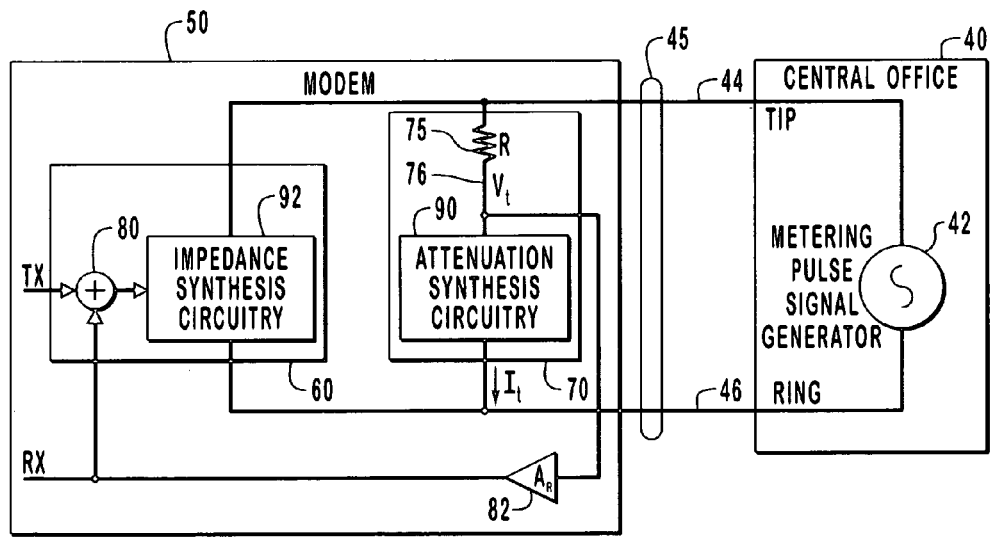
FIG. 3 is a block diagram illustrating one embodiment of the impedance synthesis circuitry present in the termination and attenuation circuitry of a connecting device.

FIG. 3 is a more detailed block diagram of a presently preferred embodiment of the termination circuitry 60 and the attenuation circuitry 70. Because of the similarities between impedance synthesis circuitry 92 and impedance synthesis circuitry 90, the following discussion, which often refers to impedance synthesis circuitry 90, also applies to impedance synthesis circuitry 92.

In this embodiment, the specified impedance that is to be provided by the termination circuitry 60 is equal to the characteristic impedance of the telephone network. Thus, impedance synthesis circuitry 92 in termination circuitry 60 generates an impedance equivalent to the characteristic impedance $Z_o$ of the telephone network to which modem 50 is connected. In a similar fashion, the impedance synthesis circuitry 90 in attenuation circuitry 70 generates an impedance that minimizes the adverse effects of the metering pulse signal on modem 50 and the data being transmitted and received by modem 50. In both instances, the specifications of telephone network 38 are satisfied.

In the illustrated embodiments, the attenuation circuitry 70 and the termination circuitry 60 are not subject to the tolerances of physical components, because they are able to digitally emulate the behavior of ideal circuit components. More specifically, impedance synthesis circuitry 90 and 92 preferably utilize a programmable digital signal processor (DSP) or the like, and software components, to synthesize a desired impedance to attenuate the metering pulse signal or match the characteristic impedance. This approach is not subject to the variable tolerances of physical circuit components. Also, the impedance synthesized is more accurate, especially when the analog to digital converters (ADC) and the digital to analog converters (DAC) have high resolution.

With regard to the illustrated embodiment, the impedance ($Z_s$) that is provided by the impedance synthesis circuitry 92 is substantially equal to the characteristic impedance $Z_o$ of the telephone network. The impedance provided by the impedance synthesis circuitry 90 is related to the metering pulse signal characteristics. By way of example, the impedance synthesis circuitry 90 uses a detection circuit to detect the line voltage ($V_t$) across tip 44 and ring 46. This voltage $V_t$ is then utilized to produce the specified impedance ($Z_s$), by providing a corresponding current value ($I_t$). Thus, the current ($I_t$) present across the terminals of the wire pair or across the full wave bridge terminals is the sensed voltage divided by the specified impedance ($I_t=V_t/Z_s$). By application of Ohms law, the impedance seen across tip 44 and ring 46 is: $V_t/I=V_t/(V_t/Z_s)=Z_s$. In this manner, impedance synthesis circuitry is capable of generating impedance across a pair of terminals or wire pair such as tip 44 and ring 46.

As is illustrated in FIG. 3, the attenuation circuitry 70 preferably includes a resistor 75, which has a value that is large in comparison to the characteristic impedance of telephone network 38. Resistor 75 serves to isolate the attenuation circuitry 70 from the tip 44 and the ring 46 leads of the telephone line. Thus, the impedance of attenuation circuitry 70 has a minimal effect on the synthesized impedance of termination circuitry 60. In this way, the primary function of resistor 75 is to comply with the requirement of the telephone network that the metering pulse signal, as well as other signals, not be attenuated at the terminals of modem 50 or other connecting device as described previously.

The transmit amplifier 80 causes the Rx and Tx signals to be summed together as a form of feedback for the attenuation circuitry 70. More specifically, the Tx signals may be separated from the RX signals by summing the appropriate level of negative Tx signal to the combined Rx and Tx signals, which allows for an Rx signal with a greatly reduced Tx content at the receive amplifier 82.

Figure 4:
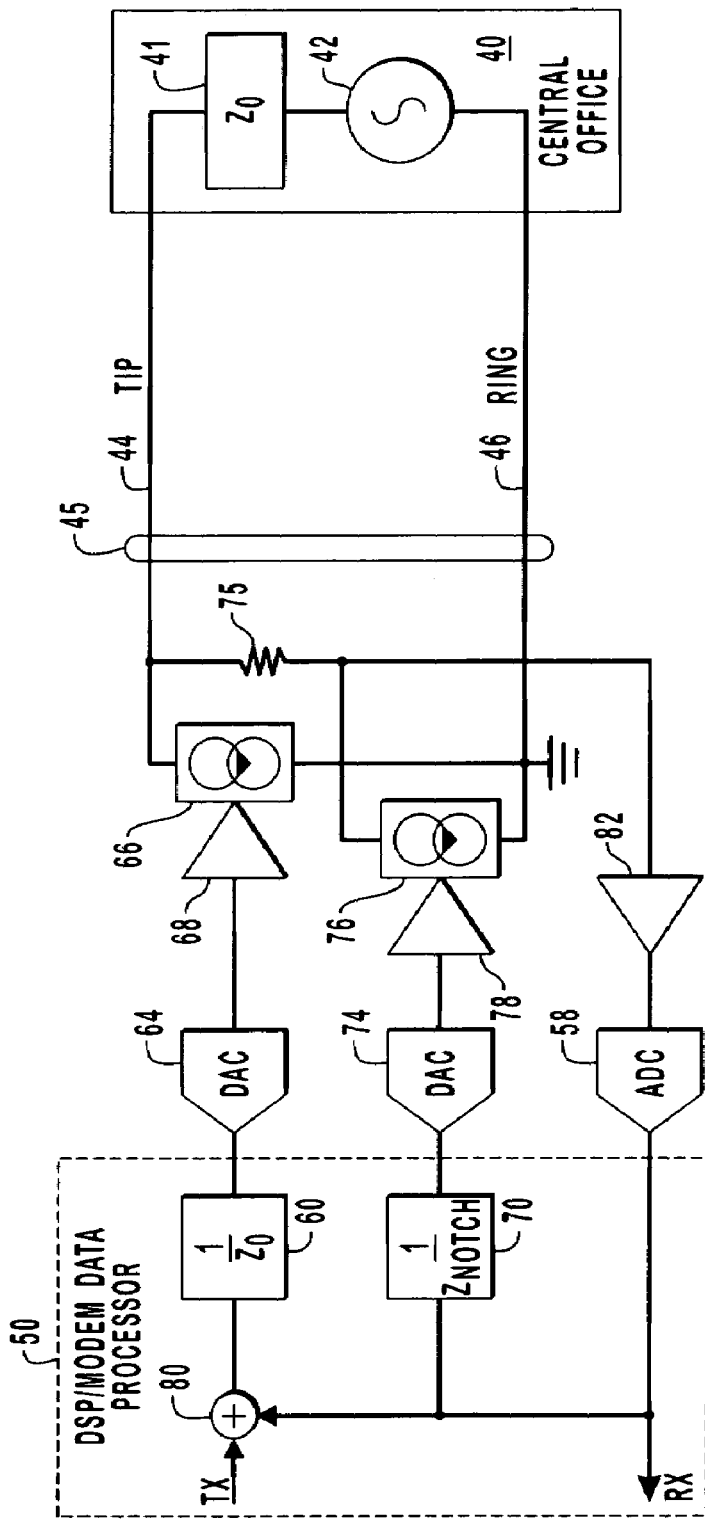
FIG. 4 is a detailed schematic illustrating additional details of one embodiment of the impedance synthesis circuitry in the attenuation circuitry and the termination circuitry of a connecting device.

Reference is next made to FIG. 4, which is a schematic diagram showing one embodiment with the relevant components for attenuation circuitry and termination circuitry. The telephone communication network associated with wire pair 45, comprising tip 44 and ring 46 lines, delivers a metering pulse and data signal to the connector from metering and signal source 42. The connector must not attenuate the metering pulse signal by more than 3 dB on wire pair 45. Additionally, the characteristic impedance 41 must be properly terminated on the connector side for efficient data transfer. In this embodiment a DSP or modem data processor 50 performs the attenuation of the metering signal via notch filter 70 and the generation of characteristic impedance via characteristic impedance synthesis circuitry 60. Some of the functions of the attenuation circuitry include, but are not limited to, preventing the metering pulse signal from saturating the receive amplifier 82 and preventing the metering pulse signal from interfering with the data being transmitted to the modem 50. The attenuation circuitry 70 is isolated from wire pair 45 by resistor 75, which has a value that is large in comparison to the characteristic impedance of telephone network. The termination circuitry 60 produces impedance substantially equal to the characteristic impedance ($Z_o$) 41 of the telephone network. Resistor 75 prevents the impedance of attenuation circuitry 70 from affecting the value of the impedance synthesized by termination circuitry 60. As such, in the absence of a metering pulse signal, which is transmitted over wire pair 45 at determined intervals, the attenuation circuitry 70 is effectively an open circuit compared to the impedance of the line.

The attenuation feedback loop is summed with the transmit signal of modem 50 at the transmit amplifier 80. The digitally synthesized output of transmit amplifier 80 is filtered by termination filter 60. The output of the termination filter 60 is first converted to a controlling voltage by DAC 64 and then into a controlling current by V-I converter 68, which controls current source 66. The current source 66 generates a current $I_t$ so as to provide the desired characteristic impedance across wire pair 45 as described above.

Likewise, when a metering pulse signal is present on the wire pair 45, the data processor receives a line voltage from ADC 58 and produces an output voltage that is calculated based upon a desired low pass or notch impedance ($Z_{notch}$) needed to sufficiently attenuate the metering pulse signal. DAC 74 converts the output of notch filter 70 into a control voltage, which is converted into a controlling current by V-I converter 78, which controls current source 76. Thus the control voltage output by DAC 74 controls current source 76. The current generated by current source 76 corresponds to the desired notch or low pass impedance value and attenuates the metering signal accordingly.

Thus the attenuation circuitry and termination circuitry configuration depicted in FIG. 4 creates several advantages. First, many connection devices incorporate a DSP, ADC and DAC interfaces, and memory. Thus, the number of extra electrical components is reduced, thereby reducing manufacturing cost and complexity. Second, the attenuation performed by the processor based attenuation circuitry has much more accuracy as compared to attenuation circuitry composed of physical circuit components or notch filters. Finally, the necessity of an external filter podule and its associated costs are eliminated. While the impedance synthesis has been generated with a DSP or modem data processor, it is understood that other configurations, including digital circuits, filters and other circuit configurations may be used. Additionally, it is understood that the impedances synthesized by the attenuation circuitry and the termination circuitry may be synthesized using the same ADC, DSP, and DAC that are frequently already present on the connecting modem device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a connecting device, a circuit for isolating and attenuating a selected network signal transmitted on a communication network having a wire pair capable of connecting with the connecting device, the circuit comprising:

an attenuating circuit connected between the connecting device and the communication network, wherein the attenuating circuit synthesizes an attenuating impedance having a predetermined magnitude such that the selected network signal is attenuated by a predetermined amount, the attenuating circuit including:

a detection circuit that detects the magnitude of a line voltage potential across the wire pair and that outputs a corresponding control signal; and a current source that produces a current having a magnitude related to the control signal and that provides the attenuating impedance having the predetermined magnitude; and a resistive circuit connected to substantially isolate the attenuating circuit from the wire pair.

2. The circuit as in claim 1, wherein the resistor has a resistive value that is relatively large in comparison to the characteristic impedance of the communication network.

3. The circuit as in claim 1, wherein the detection circuit comprises:
- an analog to digital converter circuit that provides a digital representation of the magnitude of a line voltage potential across the wire pair;
- a digital signal processing circuit that provides a control signal having a magnitude that is calculated based upon the magnitude of the line voltage and a desired attenuating impedance; and
- wherein the current source produces a current having a magnitude that is substantially equal to the line voltage divided by the desired attenuating impedance.

4. The circuit as in claim 3, wherein the attenuating circuit further comprises a digital to analog converter circuit that provides a control voltage for the current source based in part on the control signal received from the digital signal processing circuits.

5. The circuit as in claim 1, wherein the attenuating circuit attenuates the signal at an input of a receiver amplifier of the connecting device.

6. The circuit as in claim 1, further comprising a termination circuit that provides a synthesized termination impedance having a magnitude that is substantially equal to the characteristic impedance of the communication network.

7. The circuit as in claim 1, wherein the network signal is a metering pulse signal.

8. In a modem capable of connecting to a wire pair of a telephone network, a circuit for attenuating a network signal present on the wire pair, the circuit comprising:
- a resistor having a value that is relatively large in comparison to a characteristic impedance of the telephone network; and
- an impedance synthesis circuit capable of synthesizing a desired impedance magnitude that attenuates the network signal by a predetermined amount the impedance synthesis circuit comprising:
  - a generator that detects a voltage measured across the wire pair, and that calculates a current value based upon the voltage and the desired impedance; and
  - a current source which produces a current having the calculated current value so as to provide the desired synthesized impedance capable of attenuating the network signal.

9. The circuit as in claim 8, further comprising:
- an impedance synthesis circuit capable of synthesizing a desired characteristic termination impedance such that signal reflection is minimized and power transfer is maximized.

10. The circuit as in claim 9, wherein the resister is at least about 10,000 Ohms and the termination is on the order of 600 Ohms.

11. In a device capable of receiving and sending signals over a wire pair of a telephone network, a circuit for isolating and attenuating a specified network signal by a predetermined amount, the circuit comprising:
- a termination circuit capable of selectively synthesizing a termination impedance having a predetermining value that substantially matches a characteristic impedance of the telephone network; and
- an attenuation circuit capable of selectively synthesizing an attenuation impedance that is capable of attenuating the specified network signal by a predetermined amount, the attenuation circuit comprising:
  - a resistor having a value that is relatively large in comparison to a characteristic termination impedance of the telephone network; and
  - an impedance synthesis circuit capable of synthesizing a desired impedance that attenuates the network signal by a predetermined amount.

12. The circuit as in claim 11, wherein the impedance synthesis circuit comprises:
- a generator that deletes a voltage measured across the wire pair, that calculates a current value based upon the voltage and the desired impedance, and that generates a control signal based at least in part on the calculated current value; and
- a current source that produces a current having the calculated current value according to the control signal, so as to provide the desired impedance capable of attenuating the network signal.

13. The circuit as in claim 12, wherein the generator comprises:
- an analog to digital conversion circuit that detects a voltage measured across the wire pair and converts it to a representative digital signal;
- a digital signal processing circuit that receives the representative digital signal, calculates a current value necessary to generate the desired impedance, and generates a digital control signal; and
- a digital to analog conversion circuit that converts the digital control signal into the control signal based at least in part on the calculated current value.

* * * * *